(No Model.)
H. VAN HOEVENBERGH.
OPTICAL TOY.
No. 258,164.     Patented May 16, 1882.

Fig. 1ª. 

Witnesses:
Wm A Skinkle
Geo W Breck
Inventor:
Henry Van Hoevenbergh,
by his Attorney,
Frank L Pope

UNITED STATES PATENT OFFICE.

HENRY VAN HOEVENBERGH, OF ELIZABETH, NEW JERSEY.

OPTICAL TOY.

SPECIFICATION forming part of Letters Patent No. 258,164, dated May 16, 1882.

Application filed April 7, 1882. (No model.)

*To all whom it may concern:*

Be it known that I, HENRY VAN HOEVENBERGH, a citizen of the United States, and a resident of Elizabeth, in the county of Union and State of New Jersey, have invented a new and useful Improvement in Optical Toys, of which the following is a specification.

My invention relates to that class of optical toys which depend for their action upon the well-known phenomenon technically termed "persistance of vision," in which the impression of an object is maintained for a perceptible time upon the retina of the eye after the object itself has disappeared from view.

My improvement consists in the employment of a series of thin leaves of paper or other like material, and in placing upon each successive leaf a pictorial representation of some natural or artificial object, which object is repeated upon each successive leaf, but in a slightly different position. The superposed leaves, which are preferably but not necessarily of progressively varying lengths, are secured together at one of their edges bookwise, so that by holding the book thus formed by its clamped edge or back in the left hand, and bending it downward with the right hand, and then allowing the separate leaves to resume their normal position in rapid succession, the same appearance is produced to the eye as if the object represented were in motion. In this manner a great number of amusing and instructive optical illusions may be produced.

Figure 1:
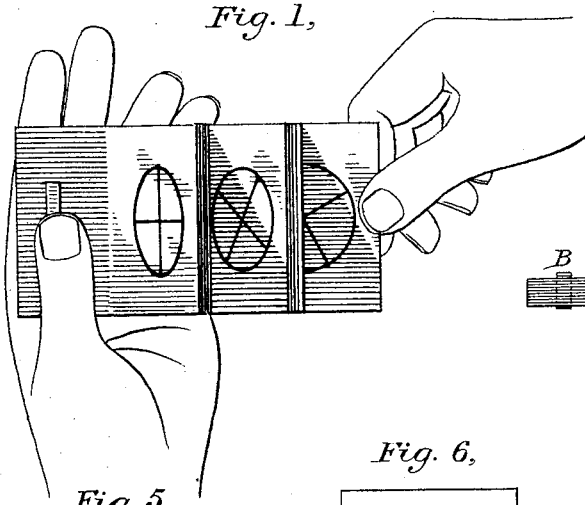

In the accompanying drawings, Figure 1 is a perspective view of my invention, in which the manner of operating it is also shown. Fig. 1ª is a longitudinal section of the same. Figs. 2, 3, 4, 5, 6, and 7 represent examples of different leaves, showing the manner in which a single object is represented in a number of different positions, whereby the optical effect of motion may be produced.

In carrying out my invention I first take a sufficient number of cards or parallelograms of moderately stiff paper, possessing a sufficient degree of resilience, which may be of any convenient size, say three by four inches or less. A sufficient number of these cards, ordinarily, say, from thirty to fifty, are placed in a pack, one upon another, as best seen at A in Fig. 1ª.

Figure 2:
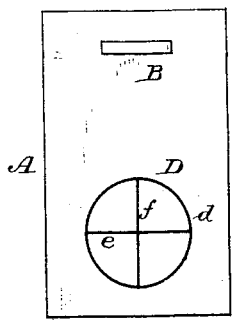
Figure 3:
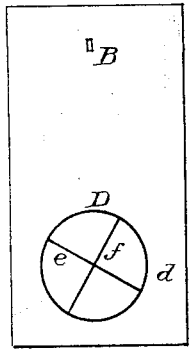
Figure 4:
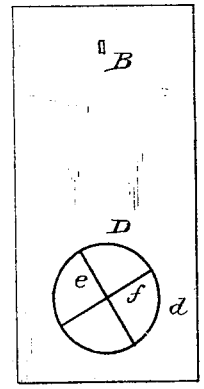

The separate cards are then secured together at one of their edges by a clamp or other device, B, of any suitable character, leaving the other three edges free. The side or end of the pack opposite to the edge which is clamped at B is preferably trimmed off in a beveled form, as shown at C, so that the length of the cards will increase progressively from the top to the bottom of the pack, by which means the convenience of handling and operating the device is materially facilitated. Each card bears upon its upper surface a pictorial representation of some object; but this object is represented in a different position upon each card. For example, in Fig. 1 I have represented an object in the form of a wheel. Fig. 2 shows the upper card of the pack, upon which the wheel D is represented as consisting of a circular rim, $d$, crossed by a horizontal bar, $e$, and a vertical bar, $f$. Fig. 3 represents a card taken from about the middle of the pack, in which the rim D occupies the same relative position upon the card, but the horizontal or vertical bars $e$ and $f$ are represented in an inclined position, as if the wheel had been turned a certain distance in the direction of the movements of the hands of a watch. The wheel is represented with the horizontal or upright bars in a position still more inclined in Fig. 4, which is the bottom card of the pack. The intermediate cards successively represent the wheel D in the various intermediate positions which it would necessarily assume in passing from the position shown in Fig. 2 to that shown in Fig. 3, and thence to that shown in Fig. 4. By grasping the pack firmly in the left hand at its clamped edge, as represented in Fig. 1, bending it downward with the right hand, and finally allowing the free ends of the several cards, from the first to the last, to slip successively and rapidly from beneath the thumb of the right hand and to regain their normal position by virtue of their inherent resiliency, the pictorial representation of the wheel D will appear to the eye as if the same were revolving upon its axis, by reason of the persistence of the image of each successive card upon the eye, as hereinbefore explained.

Figure 5:
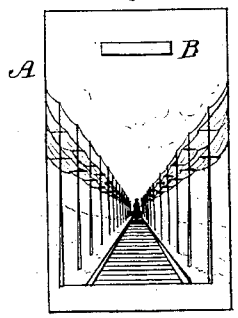
Figure 6:
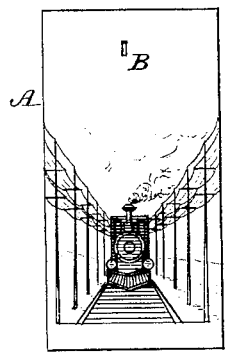
Figure 7:
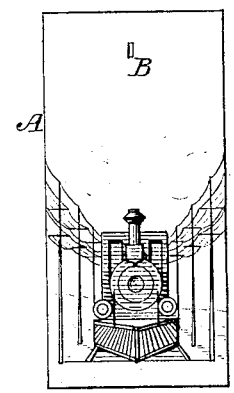

In Figs. 5, 6, and 7 I have shown another example, in which the device is made to present to the eye the illusion of a rapidly-approaching locomotive. The manner in which this is effected is precisely the same as in the first case, and will be understood by reference to the said figures without further explanation.

The cards may be secured together at one edge by sewing with cord or wire, or by any convenient device suitable for the purpose. It is immaterial whether the cards are thus united by one of their longer or their shorter edges.

I claim as my invention—

1. The combination, substantially as hereinbefore set forth, of a series of leaves in which each successive leaf bears a pictorial representation of an object in a different position, and means, substantially such as described, for securing said leaves together bookwise at one of their edges.

2. The combination, substantially as hereinbefore set forth, of a series of leaves of progressively increasing length or breadth, in which each successive leaf bears a pictorial representation of an object in a different position, and means, substantially such as described, for securing said leaves together bookwise at one of their edges.

HENRY VAN HOEVENBERGH.

Witnesses:
MILLER C. EARL,
CHARLES A. TERRY.